US007423990B2

(12) United States Patent
Kelton et al.

(10) Patent No.: US 7,423,990 B2
(45) Date of Patent: Sep. 9, 2008

(54) DYNAMICALLY ADJUSTING DATA RATE OF WIRELESS COMMUNICATIONS

(75) Inventors: James R Kelton, Austin, TX (US); James Girardeau, Austin, TX (US)

(73) Assignee: ViXS Systems Inc., Toronto, Ontario (CA)

(*) Notice: Subject to any disclaimer, the term of this patent is extended or adjusted under 35 U.S.C. 154(b) by 1172 days.

(21) Appl. No.: 10/174,371

(22) Filed: Jun. 18, 2002

(65) Prior Publication Data

US 2003/0231655 A1 Dec. 18, 2003

(51) Int. Cl.
*H04Q 7/00* (2006.01)
(52) U.S. Cl. .................... 370/329; 455/452.1
(58) Field of Classification Search .......... None
See application file for complete search history.

(56) References Cited

U.S. PATENT DOCUMENTS

| 5,565,924 | A | 10/1996 | Haskell et al. | |
|---|---|---|---|---|
| 5,768,527 | A | 6/1998 | Zhu et al. | |
| 6,108,374 | A * | 8/2000 | Balachandran et al. | 375/227 |
| 6,823,194 | B2 * | 11/2004 | Haim | 455/522 |
| 2002/0004840 | A1 | 1/2002 | Harumoto et al. | |
| 2002/0151310 | A1 * | 10/2002 | Chung et al. | 455/452 |
| 2002/0186761 | A1 * | 12/2002 | Corbaton et al. | 375/231 |
| 2003/0086371 | A1 * | 5/2003 | Walton et al. | 370/235 |
| 2003/0123406 | A1 * | 7/2003 | Yavuz et al. | 370/333 |
| 2003/0198184 | A1 * | 10/2003 | Huang et al. | 370/231 |

FOREIGN PATENT DOCUMENTS

| EP | 1 126 716 A1 | 8/2001 |
|---|---|---|
| EP | 1 187 370 A1 | 3/2002 |
| WO | WO 99/23844 | 5/1999 |

OTHER PUBLICATIONS

"Joint Downlink Beamforming, Power Control, and Data Rate Allocation for DS-CDMA Mobile Radio with Multimedia Services" by Ying-Chang Liang, et al; Centre for Wireless Communications, Singapore 117674; Dept. of Electrical Engineering, University of Maryland;Multimedia and Expo 2000, ICME 2000. 2000 IEEE International Conference-NY.
"Efficient Multiple Access Control Using a Channel-Adaptive Protocol for a Wireless ATM-based Multimedia Services Network" by Y-K Kwok, et al; Dept. of Electrical Engineering, University of Hong Kong-Mar. 29, 2000-revised Jul. 25, 2000-Computer Communications-Elsevier Science Publishers BV, Amsterdam, NL.

* cited by examiner

*Primary Examiner*—Edan Orgad
*Assistant Examiner*—Jung Park (57) ABSTRACT

A method and apparatus for dynamic data rate adjustment of a wireless transport channel include processing that begins with one of a plurality of client modules within a wireless multimedia system monitors channel characteristics of a wireless transport channel. The monitoring is done at or below a received packet rate to determine variations in the channel characteristics on a packet-by-packet basis or on a group-of-packets by group-of packets basis. The processing continues when the client module determines whether the variations in the channel characteristics affect the data rate of data contained in the packets received via the wireless transport channel. When the variations in the channel characteristics affect the data rate, the client module provides data rate adjustment feedback to a multimedia server of the wireless multimedia system via the wireless transport channel. The processing continues when the multimedia server adjusts the data rate of the data contained in the packets being transported via the wireless transport channel in accordance with the data rate adjustment feedback.

17 Claims, 7 Drawing Sheets

FIG. 7
client module 14 - 22

DYNAMICALLY ADJUSTING DATA RATE OF WIRELESS COMMUNICATIONS

TECHNICAL FIELD OF THE INVENTION

This invention related generally to wireless communication systems and more particularly to data rate adjustments within such wireless communication systems.

BACKGROUND OF THE INVENTION

As is known, wireless communication systems include a plurality of wireless communication devices that communicate via an assigned radio frequency (RF) channel or channels, which may be done directly (i.e., point-to-point) or indirectly (i.e., via the wireless communication system infrastructure). For point-to-point wireless communications, wireless communication devices communicate directly via an RF channel, which is selected by one of the wireless communication devices from a list of RF channels allocated for point-to-point communications. For indirect wireless communications, the wireless communication devices communicate via the system's infrastructure, which includes base stations (e.g., for cellular wireless communication systems, dispatched based wireless communication systems, et cetera) and/or access points (for wireless local area networks).

As is known, a base station or access point receives a request from a wireless communication device within its coverage area to establish a communication with another wireless communication device. Upon receiving the request, the base station or access point determines whether the targeted wireless communication device is within its coverage area. If so, the base station or access point provides an RF channel for the wireless communication devices to use for their communication. If, however, the targeted wireless communication device is not within the coverage area of the base station or access point, the base station or access point forwards the request to a wireless communication system controller. The wireless communication system controller determines the particular base station or access point that the targeted wireless communication device is affiliated with. The identified base station or access point allocates an RF channel for the targeted wireless communication device and, via a communication path established by the controller between the base stations or access points, the wireless communication devices are able to communicate.

As is known, a wireless communication device may be a cellular telephone, mobile radio, personal digital assistant with a wireless modem, personal computer with a wireless modem, local area network server with a wireless modem, computer with a wireless modem, interactive television, interactive home entertainment equipment, et cetera. As is also known, the content of the communication may be voice data, text data, and/or video data. Multimedia communications typically include all three, with video and audio comprising a majority of the communication.

Figure 1:
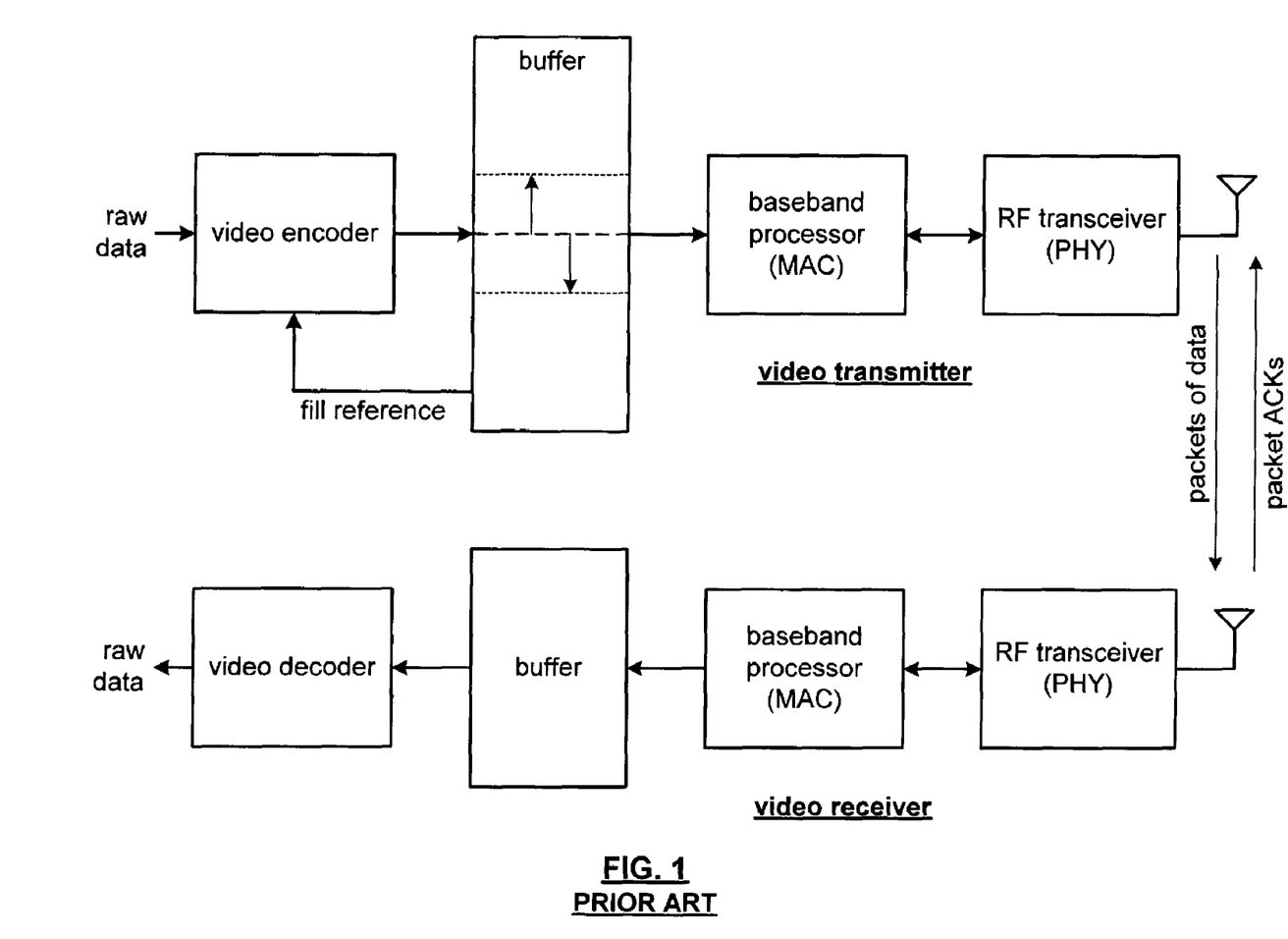
FIG. 1 is a schematic block diagram illustrating a prior art wireless communication.

FIG. 1 illustrates a wireless communication of multimedia data between wireless communication devices. In this illustration, a video transmitter is transmitting packets of encoded video data to a video receiver. The video transmitter includes a video encoder, buffer, baseband processor, and an RF transceiver. The baseband processor performs a media-specific access control protocol (MAC) in accordance with an IEEE 802 specification and the RF transceiver performs physical layer (PHY) functions in accordance with the IEEE 802 specification.

The video encoder encodes raw video and/or audio data based on a corresponding encoding function. For example, the encoding may be done in accordance with motion picture expert group (MPEG) standards. The resulting encoded data is stored in the buffer. The encoded data is retrieved from the buffer and processed via the baseband processor and transmitted by the RF transceiver as packets of data to the video receiver via a wireless communication channel. The video receiver includes an RF transceiver, baseband processor, buffer and a video decoder. The RF transceiver and baseband processor perform the inverse functions of the corresponding devices in the video transmitter. The retrieved data is stored in the buffer and eventually decoded via the video decoder to recapture the raw data.

As mentioned, the encoded data is transmitted by the video transmitter in packets of data via a wireless communication channel. For each packet of data that is successfully received by the RF transceiver of the video receiver, an acknowledgment is transmitted back to the RF transceiver of the video transmitter. If an acknowledgement is not received within a given time frame, the baseband processor (MAC layer) retransmits the packet of data and will continue the retransmission until an acknowledgment is received or the channel is dropped. Typically, if the video receiver does not provide an acknowledgment it was because the receiver was unable to accurately recapture the data contained in the packet, which is commonly referred to as packet error.

The quality of the wireless communication channel on which the packet was received greatly affects the receiver's ability to accurately recapture the data. As is known, if the quality of the wireless communication channel between the video transmitter and video receiver is high (i.e., received signals have good signal to noise ratio), the video receiver is able to accurate recapture data from most, if not all, of the packets it receives. As the quality of the RF channel decreases, the signal to noise ratio decreases, as does the receiver's ability to recapture data from the received packets, as such the packet error rate increases.

As the packet error rate increases, the baseband processor (MAC layer) is retransmitting more and more packets, which means the baseband processor is retrieving less encoded data from the buffer. As a result, the volume of data stored in the buffer increases. If the volume of data consumes the buffer's capacity, the buffer saturates (i.e., overflows), which causes data to be lost and distortion in the resulting transmitted video. Conversely, if the packet error rate is very low, the baseband processor increases the amount of data retrieved from the buffer. If the buffer empties (i.e., underflows), video transmission is interrupted and quality is compromised.

To avoid overflow or underflow, the targeted fill rate of the buffer is to keep the buffer about 50% full. If the buffer fill increases by a predetermined amount (e.g., 10-25% above 50%), the video encoder changes its encoding rate to reduce the amount of data placed in the buffer. Conversely, if the data fill rate decreases by 10-25% from 50%, the video encoder will increase the data rate of information placed in the buffer.

Accordingly, the buffer must be sized in the video transmitter to prevent the overflow or underflow condition. Since the packet error rate detection may take hundreds or even thousands of packets to alter the fill of the buffer, the size of the buffer is large. Having a large memory device in an integrated circuit increases the size of the integrated circuit, increases power consumption of the integrated circuit, and thus increases the cost of the integrated circuit.

Therefore, a need exists for a method and apparatus for a dynamically adjusting data rate of wireless communications thus allowing a reduction in the amount of data buffering needed to maintain an acceptable rate of data transference.

BRIEF SUMMARY OF THE INVENTION

In an enibodiment of the present invention for use in a wireless multimedia system that includes a multimedia server, a plurality of client modules, and a plurality of wireless transport channels, a method for dynamic data rate adjustment of a wireless transport channel of the plurality of wireless transport channels includes monitoring, by one of the plurality of client modules, channel characteristics of the wireless transport channel at or below a receive packet rate to determine variations in the channel characteristics from at least one packet to at least one other packet received via the wireless transport channel. In addition, the method determines, by the one of the plurality of client modules, whether the variations in the channel characteristics affect data rate of data contained in received packets. When the variations in the channel characteristics affect the data rate, the method provides, by the one of the plurality of client modules, data rate adjustment feedback to the multimedia server via the wireless transport channel. The method adjusts, by the multimedia server, data rate of data contained in packets being transported via the wireless transport channel in accordance with the data rate adjustment feedback.

In a further embodiment of the present invention, a method for dynamic data rate adjustment of a wireless transport channel includes monitoring channel characteristics of the wireless transport channel at or below a receive packet rate to determine variations in the channel characteristics from at least one packet to at least one other packet received via the wireless transport channel. The method determines whether the variations in the channel characteristics affect data rate of data contained in received packets. When the variations in the channel characteristics affect the data rate, the method provides data rate adjustment feedback to a source providing the received packets via the wireless transport channel.

In a further embodiment of the present invention, for use in a wireless multimedia system that includes a multimedia server, a plurality of client modules, and a plurality of wireless transport channels, a method for dynamic data rate adjustment of a wireless transport channel of the plurality of wireless transport channels includes determining, by one of the plurality of client modules, channel characteristics of the wireless transport channel at or below a receive packet rate to produce determined channel characteristics wherein the determining the channel characteristics of the wireless transport channel further comprises at least one of: determining average signal to noise ratio of the wireless transport channel on a grouping of packets by grouping of packets basis; and determining received packet error rate for a plurality of packets. The method generates, by the one of the plurality of client modules, data rate adjustment feedback based on the channel characteristics. The method provides, by the one of the plurality of client modules, the data rate adjustment feedback to the multimedia server. The method interprets, by the multimedia server, the data rate adjustment feedback to determine whether data rate of data contained in packets transported via the wireless transport channel is to he adjusted. When the data rate of data contained in packets transported via the wireless transport channel is to be adjusted, the method adjusts, by the multimedia server, data rate of packets transported via the wireless transport channel.

In a further embodiment of the present invention, a method for dynamic data rate adjustment of a wireless transport channel includes determining channel characteristics of the wireless transport channel at or below a receive packet rate to produce determined channel characteristics by at least one of: determining average signal to noise ratio of the wireless transport channel on a grouping of packets by grouping of packets basis; and determining received packet error rate for a plurality of packets. The method generates data rate adjustment feedback based on the channel characteristics and composes the data rate adjustment feedback to include an indication of at least one of: signal to noise ratio of the wireless transport channel on a packet by packet basis, the average signal to noise ratio of the wireless transport channel on a grouping of packets by grouping of packets basis, and the received packet error rate for the plurality of packets. The method provides the data rate adjustment feedback to a source.

In a further embodiment of the present invention, a method for dynamic data rate adjustment of a wireless transport channel of the plurality of wireless transport channels the method includes receiving data rate adjustment feedback wherein the data rate adjustment feedback further comprises an indication of at least one of: signal to noise ratio of the wireless transport channel on a packet by packet basis, the average signal to noise ratio of the wireless transport channel on a grouping of packets by grouping of packets basis, and the received packet error rate for the plurality of packets. The method interprets the data rate adjustment feedback to determine whether data rate of data contained in packets transported via the wireless transport channel is to be adjusted. When the data rate of data contained in packets transported via the wireless transport channel is to be adjusted, the method adjusts data rate of packets transported via the wireless transport channel.

In a further embodiment of the present invention, a wireless multimedia system includes a multimedia server that includes a server processing module and server memory, a plurality of wireless transport channels, and a plurality of client modules. Each client module of the plurality of client modules includes a client processing module and client memory. The client memory includes operational instructions that cause the client processing module to monitor channel characteristics of a wireless transport channel of the plurality of wireless transport channels at or below a receive packet rate to determine variations in the channel characteristics from at least one packet to at least one other packet received via the wireless transport channel, and to determine whether the variations in the channel characteristics affect data rate of data contained in received packets. When the variations in the channel characteristics affect the data rate, the client processing module provides data rate adjustment feedback to the multimedia server via the wireless transport channel. The server memory includes operational instructions that cause the server processing module to adjust data rate of data contained in packets being transported via the wireless transport channel in accordance with the data rate adjustment feedback.

In a further embodiment of ths present invention, an apparatus for dynamic data rate adjustment of a wireless transport channel, includes a processing module and memory operably coupled to the processing module. The memory includes operational instructions that cause the processing module to monitor channel characteristics of the wireless transport channel at or below a receive racket rate to determine variations in the channel characteristics from at least one packet to at least one other packet received via the wireless transport channel, and to determine whether the variations in the channel characteristics affect data rate of data contained in received packets. When the variations in the channel characteristics affect the data rate, the processing module provides data rate adjustment feedback to a source providing the received packets via the wireless transport channel.

In a further embodiment of the present invention, a wireless multimedia system includes a multimedia server that includes a server processing module and server memory, a plurality of wireless transport channels, and a plurality of client modules. Each of the plurality of client modules includes a client processing module and client memory, wherein the client memory includes operational instructions that cause the client processing module to determine channel characteristics of the wireless transport channel by at least one of: determining average signal to noise ratio of the wireless transport channel on a grouping of packets by grouping of packets basis; and determining received packet error rate for a plurality of packets. The client processing module further generates data rate adjustment feedback based on the channel characteristics and provides the data rate adjustment feedback to the multimedia server. The server memory includes operational instructions that cause the server processing module to interpret the data rate adjustment feedback to determine whether data rate of data contained in packets transported via the wireless transport channel is to be adjusted. When the data rate of data contained in packets transported via the wireless transport channel is to be adjusted, the server processing module adjusts the data rate of packets transported via the wireless transport channel.

In a further embodiment of the present invention, and apparatus for dynamic data rate adjustment of a wireless transport channel includes a processing module and memory operably coupled to the processing module. The memory includes operational instructions that cause the processing module to determine channel characteristics of the wireless transport channel at or below a receive packet rate to produce determined channel characteristics by at least one of: determining signal to noise ratio of the wireless transport channel on a packet by packet basis; determining average signal to noise ratio of the wireless transport channel on a grouping of packets by grouping of packets basis; and determining received packet error rate for a plurality of packets. The processing module generates data rate adjustment feedback based on the channel characteristics by composing the data rate adjustment feedback to include an indication of at least one of: signal to noise ratio of the wireless transport channel on a packet by packet basis, the average signal to noise ratio of the wireless transport channel on a grouping of packets by grouping of packets basis, and the received packet error rate for the plurality of packets. The processing module provides the data rate adjustment feedback to a source.

In a further embodiment of the present invention, an apparatus for dynamic data rate adjustment of a wireless transport channel of the plurality of wireless transport channels, includes a processing module and memory operably coupled to the processing module. The memory includes operational instructions that cause the processing module to receive data rate adjustment feedback in response to a request transmitted over the wireless transport channel, to interpret the data rate adjustment feedback to determine whether data rate of data contained in packets transported via the wireless transport channel is to be adjusted. When the data rate of data contained in jackets transported via the wireless transport channel is to be adjusted, the processing module adjusts data rate of packets transported via the wireless transport channel.

DETAILED DESCRIPTION OF THE INVENTION

Generally, the present invention provides a method and apparatus for dynamic data rate adjustment of a wireless transport channel. Such a method and apparatus includes processing that begins with one of a plurality of client modules within a wireless multimedia system monitors channel characteristics of a wireless transport channel. The monitoring is done at or below a received packet rate (i.e., the rate at which the packets are received) to determine variations in the channel characteristics (e.g., signal strength, signal-to-noise ratio, et cetera) on a packet-by-packet basis or on a group-of-packets by group-of packets basis. The processing continues when the client module determines whether the variations in the channel characteristics affect the data rate of data contained in the packets received via the wireless transport channel. When the variations in the channel characteristics affect the data rate, the client module provides data rate adjustment feedback to a multimedia server of the wireless multimedia system via the wireless transport channel. The data rate may be affected in two ways: first, the data rate is too high for the current characteristics of the channel and thus should be decreased; and second, the data rate is too low for the current characteristics of the channel and should be increased. The processing continues when the multimedia server adjusts the data rate of the data contained in the packets being transported via the wireless transport channel in accordance with the data rate adjustment feedback. The data rate adjustment feedback may contain a variety of information ranging from an increased data rate signal, decreased data rate signal, increased data rate to a specific data rate, decreased the data rate to a specific data rate, and/or an indication of the particular channel characteristics. With such a method and apparatus, the data rate at which the multimedia server is processing the data may be more dynamically and quickly adjusted based on the channel characteristics of the wireless transport channel carrying the data. The more dynamic and more instantaneous the ability to adjust the data rate, the less there is a need for a large buffer in the transmitting path. As such, integrated circuits that include a video and/or multimedia transceiver, requires less memory space for buffering encoded data thereby decreasing the power consumption of the integrated circuit, decreasing its size, and reducing its cost. Further, better link response time is obtained (i.e., reduced latency), which provides high video quality than previous systems especially during initial start-up or when the RF channel is changed.

Figure 2:
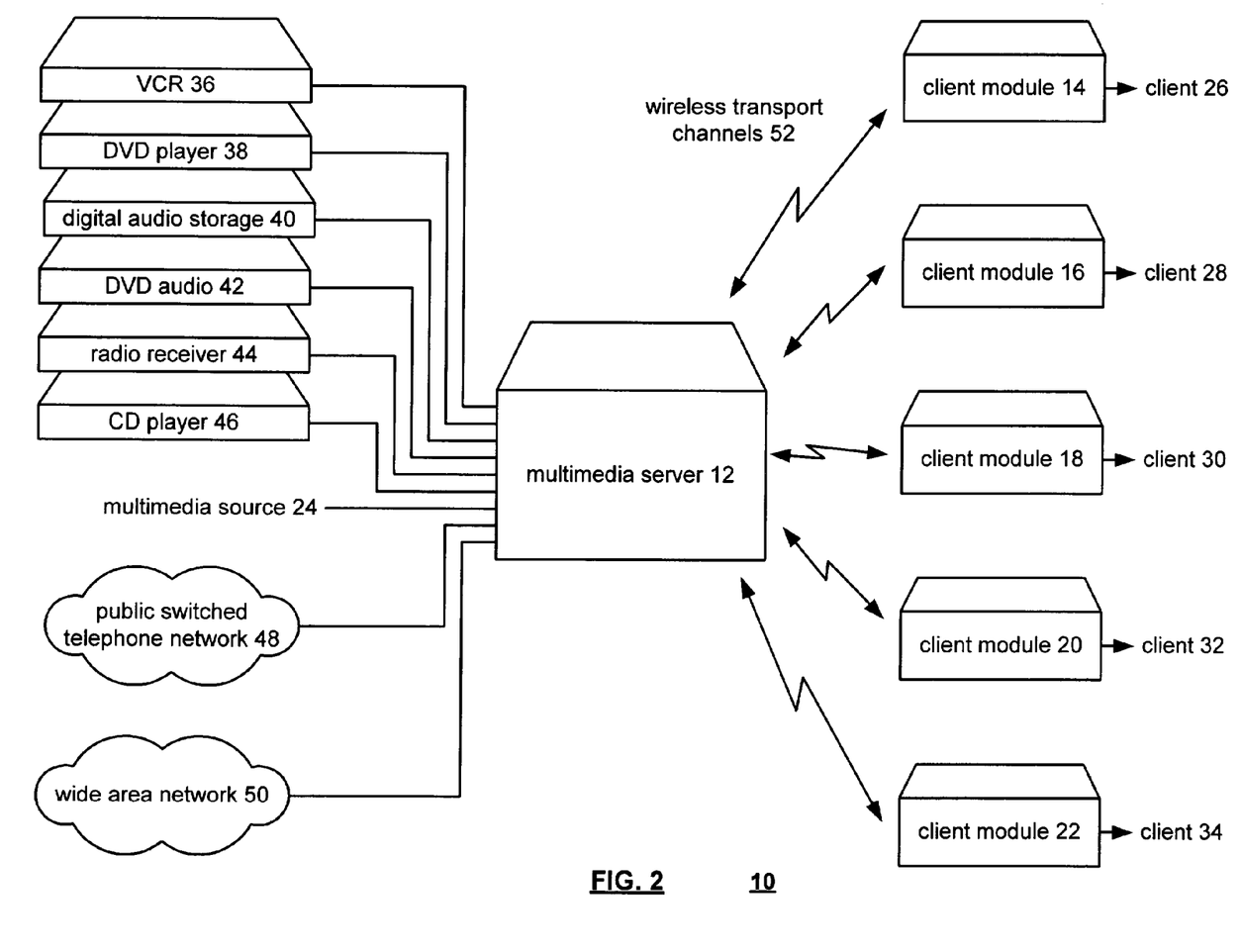
FIG. 2 is a schematic block diagram illustrating a wireless multimedia system in accordance with the present invention.

The present invention can be more fully described with reference to FIGS. 2-9. FIG. 2 illustrates a wireless multimedia system 10 that includes a multimedia server 12, a plurality of client modules 14-22, and a plurality of multimedia sources. The multimedia sources include one or more of a video cassette recorder (VCR) 36, DVD player 38, digital audio storage 40, DVD audio player 42, radio receiver 44, CD player 46, multimedia source 24, public switch telephone network 48, and/or a wide area network connection 50. The multimedia source 24 may be a satellite connection, cable connection, antenna connection for (National Television Standards Committee) NTSC television broadcasts, High Definition Television (HDTV) broadcasts, Phase Alternate Line (PAL) broadcasts, et cetera. Each of the client modules 14-22 is operably coupled to a client 26-34. A client 26-34 may be a personal digital assistant, a personal computer, a monitor (e.g., liquid crystal display (LCD) monitor, flat-panel monitor, cathode ray tube (CRT) monitor, et cetera) and may include speakers, a television set, high-definition television set, standard definition television, a home theater system, et cetera, and/or a laptop computer. As one of average skill in the art will appreciate, the client module may be a separate device from its associated client or embedded within the client. In addition, one of average skill in the art will further appreciate that the client modules 14-22 may be implemented utilizing discrete components and/or integrated circuits.

The multimedia server 12 communicates with the plurality of client modules via wireless transport channels 52. The wireless transport channels 52 may be radio frequency (RF) communication paths, infrared communication paths, other means for wirelessly conveying data between devices, and/or a combination thereof. Accordingly, the multimedia server 12 and each of the client modules include a receiver and/or a transmitter operably coupled to convey data via the wireless transport channel 52. For example, if the wireless transport channel is a RF communication path, the multimedia server 12 and each of the client modules include a radio receiver and a radio transmitter.

In this system 10, the clients 26-34 may select playback from, and/or connection to, any one of the multimedia sources. The selection request from each client is provided to its corresponding client module and identifies the desired multimedia source, a client, the desired service and any other information to assist the multimedia server 12 in processing the request. As such, one client may be accessing the Internet, while another client is watching a satellite broadcast channel, while yet another is listening to a CD playback, and a still further client is talking on the telephone. For a more detailed discussion of the wireless multimedia system of FIG. 2 refer to co-pending patent application entitled METHOD AND APPARATUS FOR A MULTIMEDIA SYSTEM, having a filing date of May 24, 2001, and a Ser. No. of 09/864,524.

Figure 3:
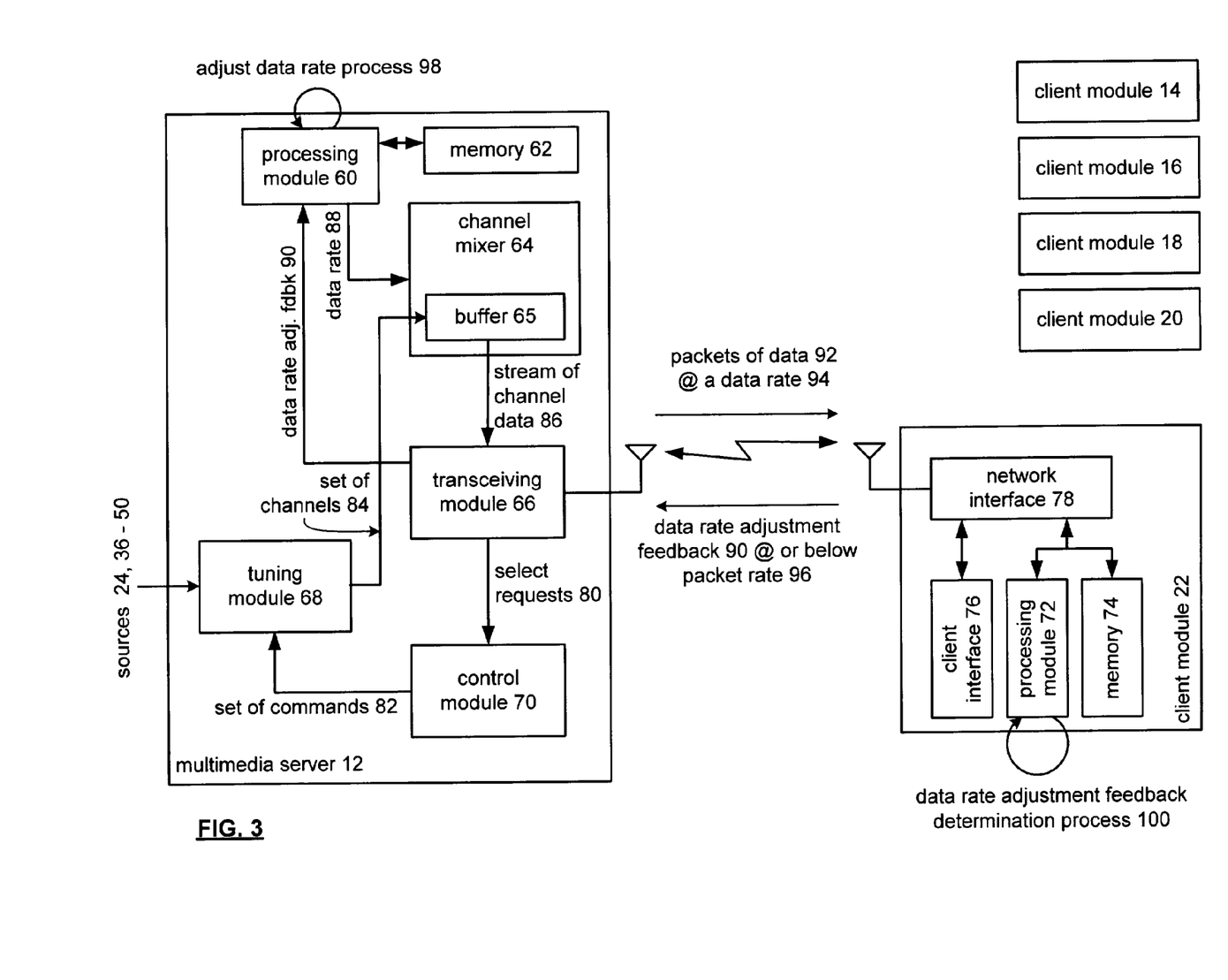
FIG. 3 is a schematic block diagram of a multimedia server and client module in accordance with the present invention.

FIG. 3 illustrates a schematic diagram of multimedia server 12 and of client module 22. Multimedia server 12 includes a processing module 60, memory 62, channel mixer 64, which includes buffer 65, transceiving module 66, tuning module 68, and control module 70. The processing module 60 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 62 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 60 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 62 stores, and the processing module 60 executes, operational instructions corresponding to at least some of the steps and/or functions illustrated in FIGS. 3-9.

In operation, the transceiving module 66 of multimedia server 12 receives requests via the plurality of client modules 14-22. The requests are provided as selection request 80 to the control module 70. The control module 70 verifies the authenticity of the selection request 80 and provides corresponding commands 82 to the tuning module 68. The tuning module 68, based on the commands 82, selects the appropriate input from the plurality of multimedia sources. The selected channels are provided to the channel mixer 64 as a set of channels 84. The channel mixer 64 processes the set of channels 84 and stores the corresponding processed data in buffer 65. One form of processing performed by the channel mixer and/or the tuning module 68 may be encoding video data wherein the encoded video data is stored in buffer 65.

The transceiving module 66 retrieves the stored data from buffer 65 as streams of channel data 86. The transceiving module 66 packetizes the stream of channel data 86 and provides packets of data 92 at a data rate 94 to the particular client module or modules.

The rate at which information is stored into buffer 65 is in accordance with the data rate 88, which is produced by the processing module 60. The processing module 60 performs an adjust data rate process 98, which will be described in greater detail with reference to FIGS. 4-9, to produce the data rate 88 based on data rate adjustment feedback 90.

The client module 22, which includes a network interface 78, client interface 76, processing module 72 and memory 74, generates the data rate adjustment feedback 90 at or below the packet rate 96. The packet rate 96 corresponds to the rate at which the packets of data 92 are provided to the client module 22. The data rate 94 corresponds to the particular data rate of the data contained in each packet of the packets of data 92. For example, depending on the modulation scheme used within the transceiving module 66, the data rate 94 may vary from 6 megabit per second to 54 megabits per second in accordance with the IEEE 802.11 a standard or at other rates for other types of wireless communication standards.

The client module 22 receives the packets of data 92 via a network interface 78, which includes a radio transceiver. The client interface 76 provides the interface to the particular client and supports the corresponding protocols with the particular client. The processing module 72 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 74 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 72 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 74 stores, and the processing module 72 executes, operational instructions corresponding to at least some of the steps and/or functions illustrated in FIGS. 3-9.

The processing module 72 performs a data rate adjustment feedback determination process 100 on each packet received and/or on a group of packets received. For each processing of a group of packets or individual packet, the processing module, in accordance with the data rate adjustment feedback determination process 100, generates the data rate adjustment feedback 90. The functionality of the data rate adjustment feedback determination process 100 will be described in greater detail with reference to FIGS. 4-9.

The data rate adjustment feedback 90 may be an indication as to the signal-to-noise ratio of the wireless transport channel on which the packets of data 92 are received, a request to increment the data rate, a request to decrement the data rate, a request to increase the data rate to a particular data rate value, a request to decrease the data rate to a particular data rate value, and/or a running average of packet error rate.

Because the client module is providing the data rate adjustment feedback 90 at or below the packet rate 96 (i.e., on a packet-by-packet basis or a grouping of packets by grouping of packets basis), the data rate 88 may be more immediately adjusted to accommodate for changes in the quality of the wireless transport channel. As such, buffer 65, in comparison to prior art systems, may be significantly smaller. Since buffer 65 is smaller, less integrated circuit die area is required to implement buffer 65 thereby decreasing the power consumption of an integrated circuit incorporating one or more components of the multimedia server 12, reducing its overall size, and reducing its cost. As one of average skill in the art will appreciate, the client module 22 may monitor the received signal strength indication of the packets received, the signal-to-noise ratio of the packets received, packet error rate and/or any other mechanism for determining quality of the wireless transport channel.

Figure 4:
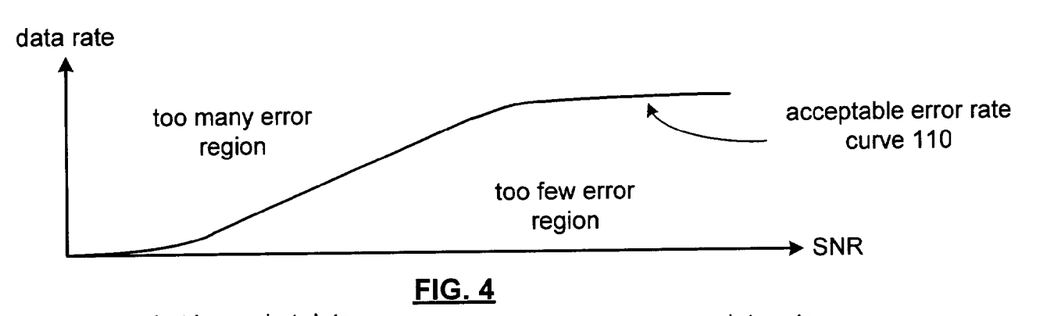
FIG. 4 is a graph representing an acceptable error rate in accordance with the present invention.

FIG. 4 illustrates a graph of data rate versus signal-to-noise ratio (SNR). In most, if not all wireless communication systems, a level of acceptable error is provided (e.g., 50 errors per million packets). This level of acceptable error is illustrated as the acceptable error rate curve 110 with respect to data rate and SNR. As shown, as the signal-to-noise ratio increases, the corresponding data rate increases as well while maintaining the acceptable level of error. However, once the signal-to-noise ratio reaches a particular value, the data rate is limited by the processing speed of the circuitry generating the data.

As shown, the acceptable error rate curve 110 divides the graph into two sections: one section indicating too many errors and another section too few errors. Too many errors occur when the data rate is too large for the current signal-to-noise ratio. As such, with reference to FIG. 3, the transceiving module 66 has to retransmit many packets, thus causing buffer 65 to fill. If the signal-to-noise ratio does not improve or the data rate is not decreased, the buffer 65 will overflow.

The other region of the graph of FIG. 4 is when too few errors are produced. In this region, the data rate is lower than optimal for the given signal-to-noise ratio. In this instance, more data is being retrieved from the buffer by the transceiving module 66 than is being put in by the channel mixer 64. As such, the data rate can be increased. As one of average skill in the art will appreciate, the signal-to-noise ratio of any data transmission via a wireless transport channel may vary significantly on a packet-by-packet basis or even within the transmission of the same packet. As such, the data rate to signal-to-noise ratio curve of FIG. 4 varies frequently and may vary dramatically from packet to packet.

Figure 5:
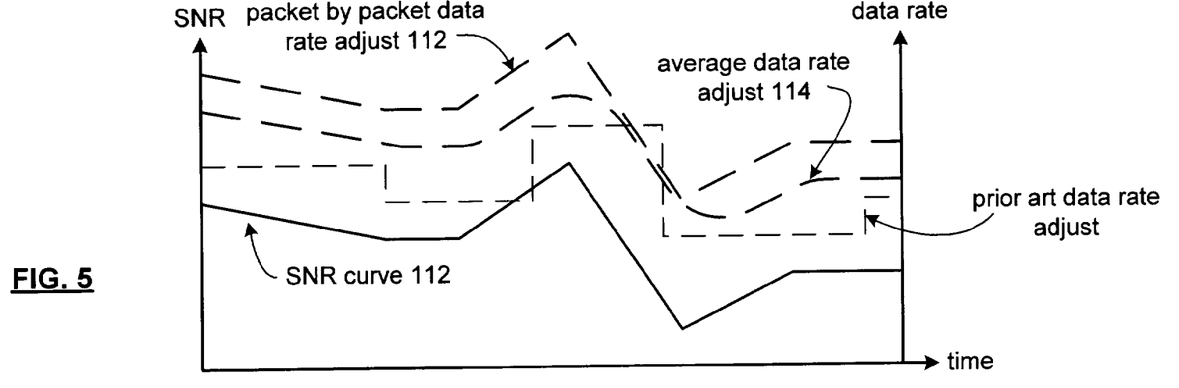
FIG. 5 is a graph depicting signal-to-noise ratio over time and data rate over time in accordance with the present invention.

FIG. 5 illustrates a graph of signal-to-noise ratio over time and data rate over time. The signal-to-noise ratio curve 112 is shown to vary over time. In prior art systems, since it took hundreds or even thousands of packets to recognize an overflow or underflow condition, the data rate did not change correspondingly to the signal-to-noise ratio curve 112. As shown, the prior art data rate changes from a higher level to a lower level as the signal-to-noise curve 112 decreases, but significantly later in time as to when the curve 112 began to decrease. Similarly, the prior art data rate increases significantly later in time with respect to when the signal-to-noise ratio curve increases. As a result, the buffer fill rate varies significantly from the 50% fill rate.

Figure 6:
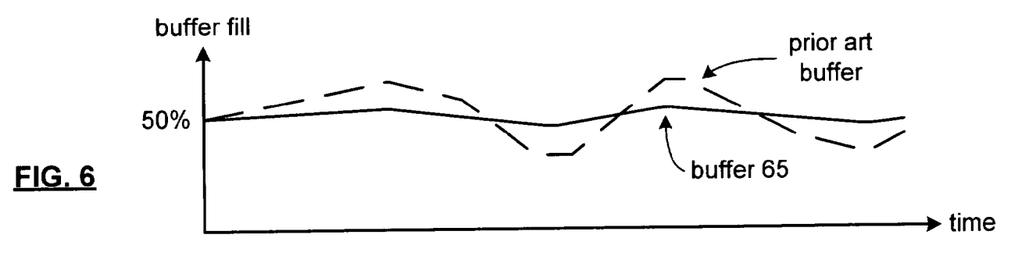
FIG. 6 is a graph illustrating a buffer fill over time in accordance with the present invention.

Referring simultaneously to FIGS. 5 and 6, FIG. 6 illustrates the fill rate of the buffer for the prior art as well as for embodiments of the present invention with respect to a 50% level. As the signal-to-noise ratio curve 112 decreases (FIG. 5), and the prior art data rate adjust remains the same (FIG. 5), the buffer fill increases (FIG. 6). When the prior art buffer fill reaches a predetermined threshold (FIG. 6), the prior art data rate is adjusted down (FIG. 5). At this point, the buffer fill begins to decrease as the signal-to-noise curve 112 stabilizes. As the signal-to-noise curve increases (FIG. 5), the buffer fill decreases (FIG. 6) and the prior art data rate adjust remains constant.

When the buffer fill rate for the prior art system reaches a predetermined threshold below 50%, the prior art data rate is adjusted upward. This process continues as shown wherein the prior art buffer fill rate toggles between a threshold above 50% and a threshold below 50% and the corresponding data rate is adjusted based thereon.

In accordance with the present invention, the data rate may be adjusted to more closely follow the signal-to-noise curve 112. This may be done on a packet-by-packet data rate adjustment 112 or an average data rate adjustment 114, i.e., on a group of packets by group of packets basis. The packet-by-packet data rate adjustment 112 is shown in FIG. 5 to track the signal-to-noise curve 112. Simultaneously referring to FIG. 6, the buffer fill rate for buffer 65 stays almost linear with respect to the 50% reference point. Accordingly, the buffer 65 may be a significantly smaller buffer than the prior art buffer since its deviation with respect to the data rate is substantially less. For example, the buffer size reduction between buffer 65 and the prior art buffer may be in the range of a few percent to 80%.

The average data rate adjust 114 is based on the signal-to-noise ratio of groups of packets and averaged over time. As such, the average data rate adjust 114 follows the signal-to-noise curve 112 and has more subtle deviations than the packet-by-packet data rate adjust 112. As one of average skill in the art will appreciate, other methods for determining the data rate adjust based on a packet-by-packet determination of signal-to-noise ratio or groupings of packets signal-to-noise ratio to achieve the desired affects illustrated in FIG. 6 may be used.

Figure 7:
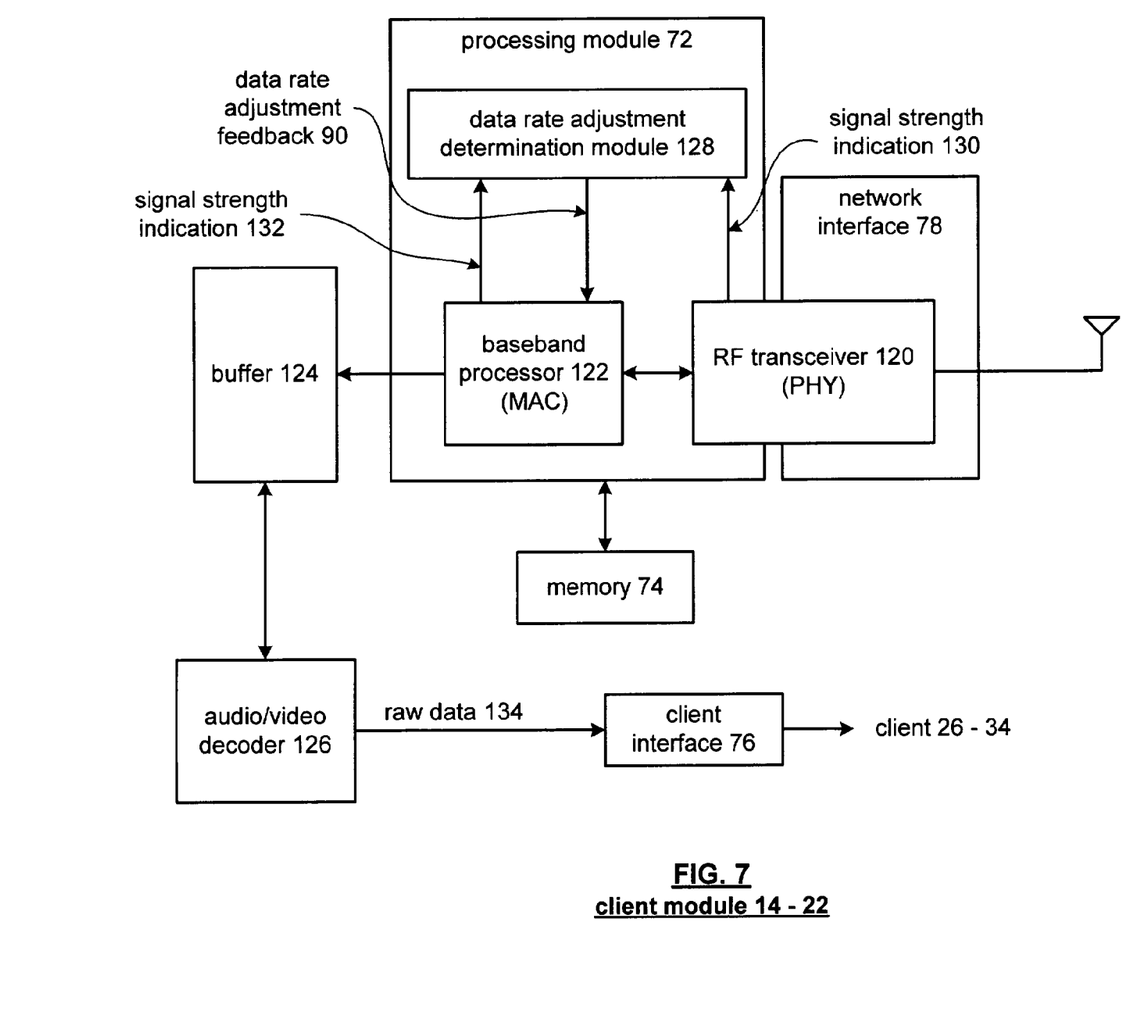
FIG. 7 is a schematic block diagram of a client module in accordance with the present invention.

FIG. 7 illustrates a schematic block diagram of a client module 14-22. The client module 14-22 includes the processing module 72, the network interface 78, memory 74, buffer 124, an audio/video decoder 126 and the client interface 76. The network interface 78 includes an RF transceiver 120 that performs the physical layer function for the client module. The processing module 72 is configured to provide a data rate adjustment determination module 128 and a baseband processor 122 that performs the MAC layer function for client module 14-22. In operation, the RF transceiver 120 receives packets of data via the associated antenna. The RF transceiver 120, which may include a signal-to-noise ratio module, a receive signal strength indication module, and/or any other mechanism for determining the signal strength, signal to noise ratio, and/or signal to interference ratio, produces a signal strength indication 130. In addition, the RF transceiver 120 converts the RF packets of data into baseband packets of data that are provided to the baseband processor 122. The data rate adjustment determination module 128, which may implement portions of the processes illustrated in FIG. 8 or 9, determines the data rate adjustment feedback 90 based on the signal strength indication 130.

Alternatively, the baseband processor 120 may determine the signal strength from the baseband signals received from the RF transceiver 120. In this alternative, the baseband processor 122 provides signal strength indication 132 to the data rate adjustment determination module 128. The baseband processor 122, to determine the signal strength indication 132, may include a signal-to-noise ratio module, receive signal strength indication module, and/or any other mechanism for determining signal strength with respect to noise and/or interference.

The data rate adjustment determination module 128 provides the data rate adjustment feedback 90 to the baseband processor 122. The baseband processor 122 encodes and/or modulates the data rate adjustment feedback 90 in accordance with the particular wireless communication standard being implemented by the multimedia communication system. For example, the baseband processor 122 may encode and/or modulate the data rate adjustment feedback 90 in accordance with one of the IEEE 802 standards. The baseband processor 122 provides the encoded and/or modulated data rate adjustment feedback 90 to the RF transceiver 120. The RF transceiver converts the baseband representation of the data rate adjustment feedback 90 into an RF signal that is transmitted via the antenna to the multimedia server 12.

For the data packets received, the baseband processor 122 decodes them and provides the decoded or raw information to buffer 124. The audio/video decoder 126 retrieves the decoded data from buffer 124 and recaptures raw video data 134 therefrom. The raw video data may be RGB information, YUV information, et cetera. The client interface 76 receives the raw data 134 and provides it to its associated client 26-34.

Figure 8:
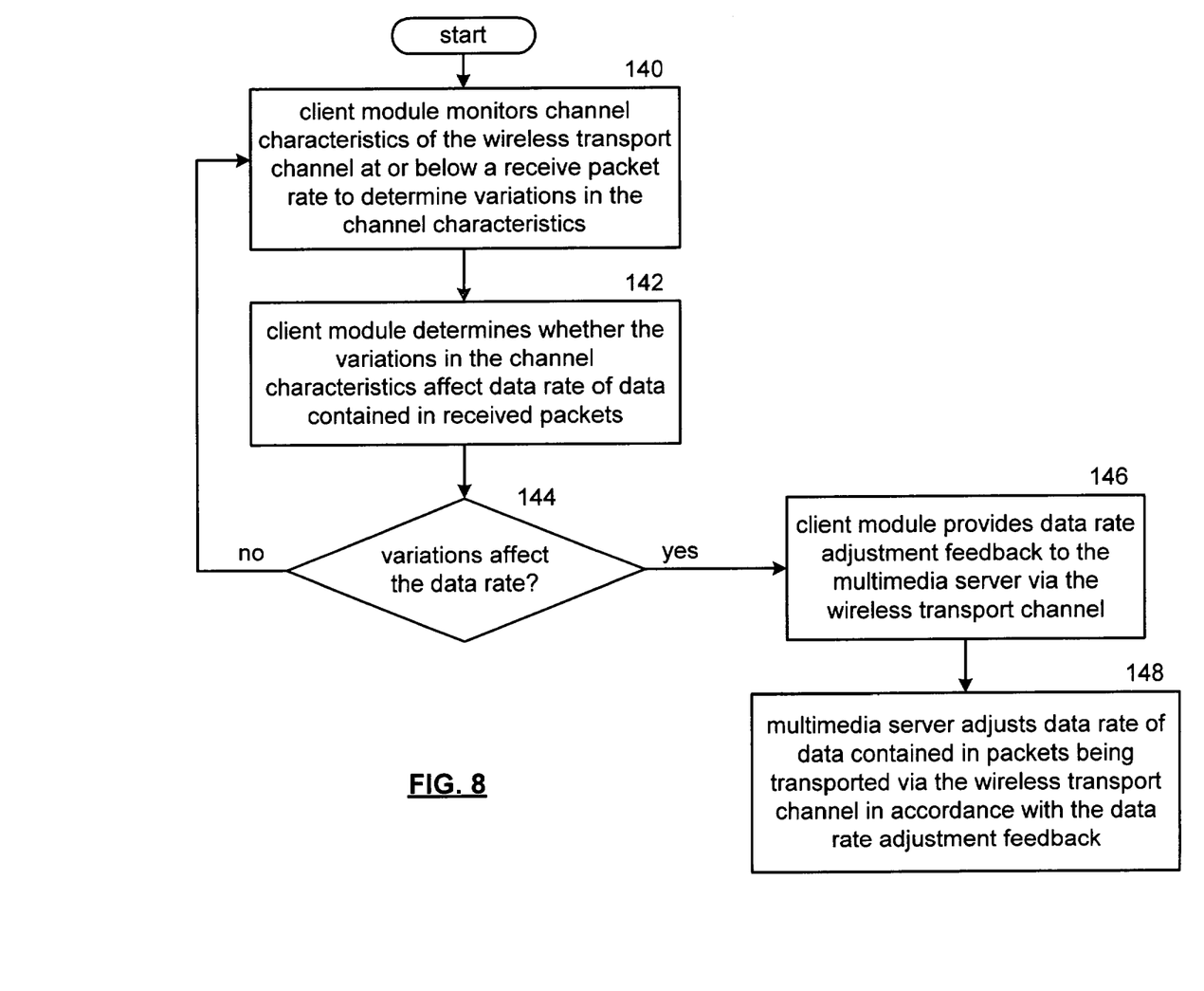
FIG. 8 is a logic diagram illustrating a method for dynamic data rate adjustment of a wireless transport channel in accordance with the present invention.

FIG. 8 illustrates a logic diagram of a method for dynamic data rate adjustment of a wireless transport channel in a wireless multimedia system. The process begins at Step 140 where a client module monitors channel characteristics of a wireless transport channel at or below a receive packet rate to determine variations in the channel characteristics. The channel characteristics include signal-to-noise ratio, receive strength indication, signal to interference ratio, frequency response, and/or nay other measure that provides information regarding the quality of the channel. Such a determination may be done on a packet-by-packet basis or on a grouping-of-packets by grouping-of-packets basis and may be done in a variety of ways including receive signal strength indication, spectral analysis, signal-to-interference calculations, received packet error, et cetera.

The process then proceeds to Step 142 where the client module determines whether the variations in the channel characteristics affect data rate of data contained within the received packets. In this instance, the client module is comparing the current channel characteristics of a packet or group of packets with channel characteristics of previous packets. From this comparison, variations in the channel characteristics are obtained. For example, if the signal rate substantially decreases, the variations may affect the data rate. Conversely, if the signal-to-noise ratio dramatically increases, this also may affect the data rate. A relationship between the signal-to-noise ratio and data rate was graphically illustrated in FIG. 5.

The process then proceeds to Step 144 where the process branches based on the determination of whether the variations affect the data rate. If not, the client module continues to monitor the channel characteristics of the transport channel on which it is receiving packets of data. If, however, the variations do affect the data rate, the process proceeds to Step 146. At Step 146, client module provides data rate adjustment feedback to the multimedia server via the wireless transport channel. The data rate adjustment feedback may be a message requesting that the data rate be incremented or it may be a message indicating that the data rate should be decremented. The incrementing and/or decrementing of the data rate by the multimedia server would be in predetermined steps as programmed in the multimedia server. The data rate adjustment feedback may also be a message requesting that the data rate be increased to a particular data rate value or a message indicating that the data rate should be decreased to a particular data rate value. The determination of a particular data rate value is readily obtainable from the signal-to-noise ratio versus data rate curve and further in accordance with the particular wireless communication standard being implemented as well as the particular video encoding standard being implemented. For example, the particular data rate adjustment may be requesting a shift from 54 megabits per second to 48 megabits per second and/or a switching of video quality with respect to the video encoding performed by the multimedia server.

The process then proceeds to Step 148 where the multimedia server adjusts the data rate of the data contained in the packets that are transported to the client module via the wireless transport channel. Such an adjustment is based on the data rate adjustment feedback. For example, the multimedia server may increment the data rate based on an increment value included in the data rate adjustment feedback, decrease the data rate based on a decrement value contained in the data rate adjustment feedback, et cetera.

Figure 9:
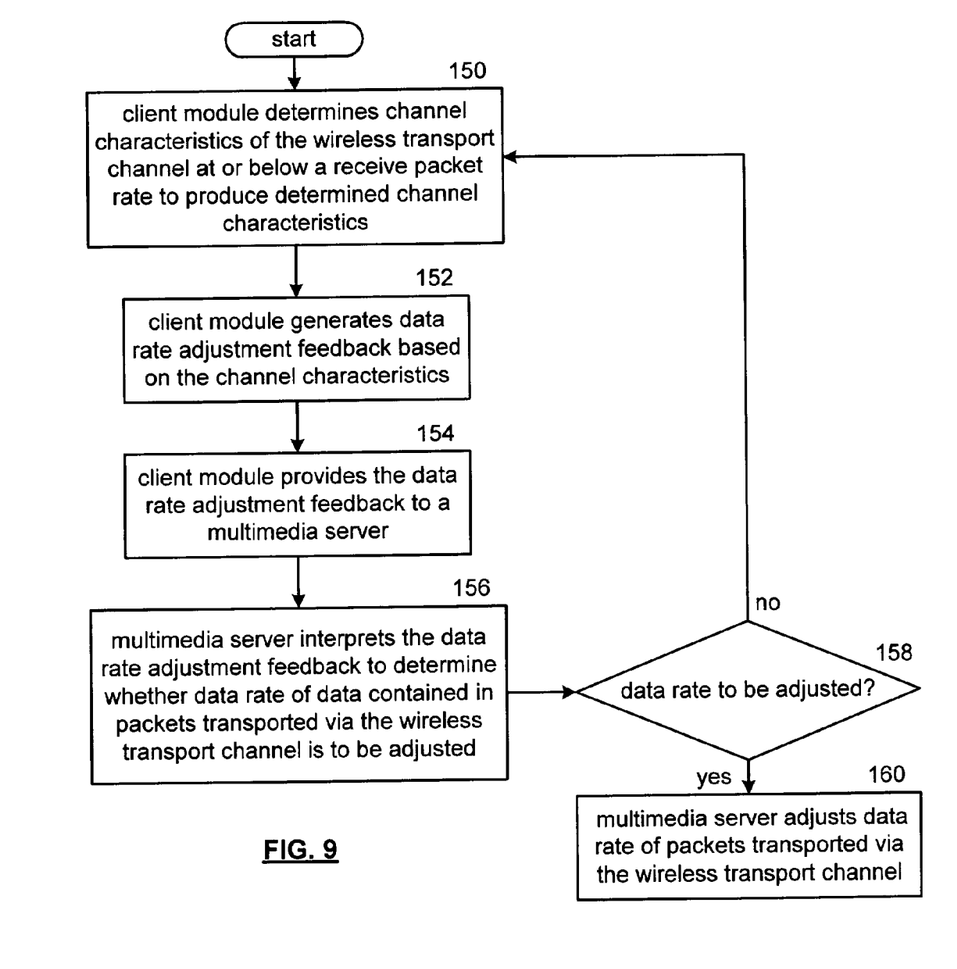
FIG. 9 is a logic diagram illustrating an alternate method for dynamic data rate adjustment of a wireless transport channel in accordance with the present invention.

FIG. 9 illustrates an alternate method for dynamic data rate adjustment of a wireless transport channel in a wireless multimedia system. The process begins at Step 150 where a client module determines channel characteristics of a wireless transport channel at or below a received packet rate to produce determine channel characteristics. The determination of the channel characteristics may be done to determine the signal-to-noise ratio, frequency response, and/or any other characteristics of the channel that may indicate degradation in performance or an increase in performance of the channel. The determination of the channel characteristics may be done on a packet-by-packet basis or on a grouping-of-packets by grouping-of-packets basis. For example, a per packet signal-to-noise ratio value may be generated or an average signal-to-noise ratio may be generated.

The process then proceeds to Step 152 where the client module generates data rate adjustment feedback based on the channel characteristics. The content of the data rate adjustment feedback may vary from providing the channel characteristics (e.g., the signal-to-noise ratio, frequency response, et cetera), in the data rate adjustment feedback packet error rate, and/or interpretive data thereof indicating the channel characteristics. The process then proceeds to Step 154 where the client module provides the data rate adjustment feedback to the multimedia server. The data rate adjustment feedback may be transmitted on a packet-by-packet basis, a grouping of packets by grouping-of-packet basis, at predetermined time intervals, or at random time intervals. The process then proceeds to Step 156 where the multimedia server interprets the data rate adjustment feedback to determine whether the data rate of the data contained in the packets transported via the wireless transport channel should be adjusted.

The process then proceeds to Step 158 where the process splits based on whether the data rate is to be adjusted. If not, the process reverts to Step 150. If, however, the data rate is to be adjusted, the process proceeds to Step 160. At Step 160, the multimedia server adjusts the data rate of packets being transported via the wireless transport channel based on its interpretation. By providing feedback on the quality of the wireless transport channel on a packet-by-packet basis or a grouping of packet by grouping-of-packet basis, the loop response to adjust the data rate of data contained in the packets is much faster than in prior art embodiments. As such, much less buffering is needed when the present invention is implemented. By reducing the size of required buffering, integrated circuits are required to support less memory, which reduces the size, power consumption and cost of such integrated circuits. Further, less than 100% capacity of the channel may be used to convey the data and the data rate adjusted accordingly. As one of average skill in the art will appreciate, other embodiments may be derived from the teaching of the present invention, without deviating from the scope of the claims.

What is claimed is:

1. In a wireless multimedia system that includes a multimedia server, a plurality of client modules, and a plurality of wireless transport channels, a method for dynamic data rate adjustment of a wireless transport channel of the plurality of wireless transport channels, the method comprises:

determining, by one of the plurality of client modules, channel characteristics of the wireless transport channel at or below a receive packet rate to produce determined channel characteristics wherein the determining the channel characteristics of the wireless transport channel further comprises at least one of:

determining average signal to noise ratio of the wireless transport channel on a grouping of packets by grouping of packets basis;

determining received packet error rate for a plurality of packets;

generating, by the one of the plurality of client modules, data rate adjustment feedback based on the channel characteristics, wherein generating the data rate adjustment feedback includes:

determining variations in the channel characteristics;

determining whether the variations in the channel characteristics affect the data rate of data contained in the packets; and when the variations in the channel characteristics affect the data rate, providing the data rate adjustment feedback to indicate an increase or a decrease in the data rate;

providing, by the one of the plurality of client modules, the data rate adjustment feedback to the multimedia server;

interpreting, by the multimedia server, the data rate adjustment feedback to determine whether data rate of data contained in packets transported via the wireless transport channel is to be adjusted; and when the data rate of data contained in packets transported via the wireless transport channel is to be adjusted, adjusting, by the multimedia server, data rate of packets transported via the wireless transport channel.

2. The method of claim 1, wherein the providing data rate adjustment feedback further comprises at least one of:

providing an increment data rate message;

providing a decrement data rate message;

providing an increased data rate value; and providing a decreased data rate value.

3. The method of claim 1, wherein the generating of the data rate adjustment feedback further comprises at least one of:

generating the data rate adjustment feedback on a packet by packet basis;

generating the data rate adjustment feedback on a grouping of packets by grouping of packets basis;

generating the data rate adjustment feedback on a periodic basis; and generating the data rate adjustment feedback in response to a request from the multimedia server.

4. A method for dynamic data rate adjustment of a wireless transport channel, the method comprises:

determining channel characteristics of the wireless transport channel at or below a receive packet rate to produce determined channel characteristics by at least one of:

determining average signal to noise ratio of the wireless transport channel on a grouping of packets by grouping of packets basis;

determining received packet error rate for a plurality of packets;

generating data rate adjustment feedback based on the channel characteristics and composing the data rate adjustment feedback to include an indication of at least one of: signal to noise ratio of the wireless transport channel on a packet by packet basis, the average signal to noise ratio of the wireless transport channel on a grouping of packets by grouping of packets basis, and the received packet error rate for the plurality of packets, wherein generating the data rate adjustment feedback frirther includes:

determining variations in the channel characteristics:

determining whether the variations in the channel characteristics affect the data rate of data contained in the packets: and when the variations in the channel characteristics affect the data rate, providing the data rate adjustment feedback to indicate an increase or a decrease in the data rate; and providing the data rate adjustment feedback to a source.

5. The method of claim 4, wherein the providing data rate adjustment feedback further comprises at least one of:

providing an increment data rate message; providing a decrement data message;

providing an increased data rate value; and providing a decreased data rate value.

6. A method for dynamic data rate adjustment of a wireless transport channel of the plurality of wireless transport channels, the method comprises:

receiving data rate adjustment feedback wherein the data rate adjustment feedback includes an indication of at least one of: signal to noise ratio of the wireless transport channel on a packet by packet basis, an average signal to noise ratio of the wireless transport channel on a grouping of packets by grouping of packets basis, and a received packet error rate for the plurality of packets;

interpreting the data rate adjustment feedback to determine whether data rate of data contained in packets transported via the wireless transport channel is to be adjusted, wherein interpreting the data rate adjustment feedback further includes:

interpreting the indication to determine variations in the channel characteristics of the wireless transport channel with respect to a current data rate;

when the variations in the channel characteristics indicate that the current data rate is too slow, determining that the data rate of the data contained in the packets is to be increased; and when the variations in the channel characteristics indicate that the current data rate is too fast, determining that the data rate of the data contained in the packets is to be decreased; and when the data rate of data contained in packets transported via the wireless transport channel is to be adjusted, adjusting data rate of packets transported via the wireless transport channel.

7. The method of claim 6, wherein the receiving the data rate adjustment feedback further comprises at least one of:
   receiving an increment data rate message;
   receiving a decrement data message;
   receiving an increased data rate value; and
   receiving a decreased data rate value.

8. The method of claim 6, wherein the receiving of the data rate adjustment feedback further comprises at least one of:
   receiving the data rate adjustment feedback on a packet by packet basis;
   receiving the data rate adjustment feedback on a grouping of packets by grouping of packets basis;
   receiving the data rate adjustment feedback on a periodic basis; and
   receiving the data rate adjustment feedback in response to a request.

9. A wireless multimedia system comprises:
   a multimedia server that includes a server processing module and server memory;
   a plurality of wireless transport channels; and
   a plurality of client modules, wherein each of the plurality of client modules includes a client processing module and client memory, wherein the client memory includes operational instructions that cause the client processing module to:
      determine channel characteristics of the wireless transport channel at or below a receive packet rate to produce determined channel characteristics by at least one of:
         determining average signal to noise ratio of the wireless transport channel on a grouping of packets by grouping of packets basis; and
         determining received packet error rate for a plurality of packets;
      generate data rate adjustment feedback based on the channel characteristics;
         determining variations in the channel characteristics;
         determining whether the variations in the channel characteristics affect the data rate of data contained in the packets; and
         when the variations in the channel characteristics affect the data rate, providing the data rate adjustment feedback to indicate an increase or a decrease in the data rate;
      provide the data rate adjustment feedback to the multimedia server;
   wherein the server memory includes operational instructions that cause the server processing module to:
      interpret the data rate adjustment feedback to determine whether data rate of data contained in packets transported via the wireless transport channel is to be adjusted; and
      when the data rate of data contained in packets transported via the wireless transport channel is to be adjusted, adjust data rate of packets transported via the wireless transport channel.

10. The wireless multimedia system of claim 9, wherein the client memory further comprises operational instructions that cause the client processing module to provide the data rate adjustment feedback by at least one of:
   providing an increment data rate message;
   providing a decrement data message;
   providing an increased data rate value; and
   providing a decreased data rate value.

11. An apparatus for dynamic data rate adjustment of a wireless transport channel, the apparatus comprises:
   processing module; and
   memory operably coupled to the processing module, wherein the memory includes operational instructions that cause the processing module to:
      determine channel characteristics of the wireless transport channel at or below a receive packet rate to produce determined channel characteristics by at least one of:
         determining signal to noise ratio of the wireless transport channel on a packet by packet basis;
         determining average signal to noise ratio of the wireless transport channel on a grouping of packets by grouping of packets bases;
         determining received packet error rate for a plurality of packets;
      generate data rate adjustment feedback based on the channel characteristics by:
         determining variations in the channel characteristics;
         determining whether the variations in the channel characteristics affect the data rate of data contained in the packets; and
         when the variations in the channel characteristics affect the data rate, providing the data rate adjustment feedback to indicate an increase or a decrease in the data rate; and
      provide the data rate adjustment feedback to a source.

12. The apparatus of claim 11, wherein the memory further comprises operational instructions that cause the processing module to provide the data rate adjustment feedback by at least one of:
   providing an increment data rate message;
   providing a decrement data message;
   providing an increased data rate value; and
   providing a decreased data rate value.

13. The apparatus of claim 11, wherein the memory further comprises operational instructions that cause the processing module to generate the data rate adjustment feedback by at least one of:
   generating the data rate adjustment feedback on a packet by packet basis;
   generating the data rate adjustment feedback on a grouping of packets by grouping of packets basis;
   generating the data rate adjustment feedback on a periodic basis; and
   generating the data rate adjustment feedback in response to a request from the multimedia server.

14. An apparatus for dynamic data rate adjustment of a wireless transport channel of the plurality of wireless transport channels, the apparatus comprises:
   processing module; and
   memory operably coupled to the processing module, wherein the memory includes operational instructions that cause the processing module to:
      receive data rate adjustment feedback in response to a request transmitted over the wireless transport channel, wherein the data rate adjustment feedback further includes an indication of at least one of:

signal to noise ratio of the wireless transport channel on a packet by packet basis, the average signal to noise ratio of the wireless transport channel on a grouping of packets by grouping of packets basis, and the received packet error rate for the plurality of packets, and wherein the memory further comprises operational instructions that cause the processing module to interpret the data rate adjustment feedback by: interpreting the indication to determine variations in the channel characteristics of the wireless transport channel with respect to a current data rate;

when the variations in the channel characteristics indicate that the current data rate is too slow, determining that the data rate of the data contained in the packets is to be increased; and when the variations in the channel characteristics indicate that the current data rate is too fast, determining that the data rate of the data contained in the packets is to be decreased;

interpret the data rate adjustment feedback to determine whether data rate of data contained in packets transported via the wireless transport channel is to be adjusted; and when the data rate of data contained in packets transported via the wireless transport channel is to be adjusted, adjust data rate of packets transported via the wireless transport channel.

15. The apparatus of claim 14, wherein the memory further comprises operational instructions that cause the processing module to receive the data rate adjustment feedback by at least one of:

receiving an increment data rate message;
receiving a decrement data message;
receiving an increased data rate value; and
receiving a decreased data rate value.

16. In a wireless multimedia system that includes a multimedia server, a plurality of client modules, and a plurality of wireless transport channels, a method for dynamic data rate adjustment of a wireless transport channel of the plurality of wireless transport channels, the method comprises:

determining, by one of the plurality of client modules, channel characteristics of the wireless transport channel at or below a receive packet rate to produce determined channel characteristics wherein the determining the channel characteristics of the wireless transport channel further comprises at least one of:

determining average signal to noise ratio of the wireless transport channel on a grouping of packets by grouping of packets basis;

determining received packet error rate for a plurality of packets;

generating, by the one of the plurality of client modules, data rate adjustment feedback based on the channel characteristics, wherein generating the data rate adjustment feedback includes:

composing the data rate adjustment feedback to include an indication of at least one of: signal to noise ratio of the wireless transport channel on a packet by packet basis, the average signal to noise ratio of the wireless transport channel on a grouping of packets by grouping of packets basis, and the received packet error rate for the plurality of packets;

providing, by the one of the plurality of client modules, the data rate adjustment feedback to the multimedia server;

interpreting, by the multimedia server, the data rate adjustment feedback to determine whether data rate of data contained in packets transported via the wireless transport channel is to be adjusted, wherein interpreting the data rate adjustment feedback includes:

interpreting the indication to determine variations in the channel characteristics of the wireless transport channel with respect to a current data rate;

when the variations in the channel characteristics indicate that the current data rate is too slow, determining that the data rate of the data contained in the packets is to be increased; and when the variations in the channel characteristics indicate that the current data rate is too fast, determining that the data rate of the data contained in the packets is to be decreased; and when the data rate of data contained in packets transported via the wireless transport channel is to be adjusted, adjusting, by the multimedia server, data rate of packets transported via the wireless transport channel.

17. A wireless multimedia system comprises:

a multimedia server that includes a server processing module and server memory;

a plurality of wireless transport channels; and a plurality of client modules, wherein each of the plurality of client modules includes a client processing module and client memory, wherein the client memory includes operational instructions that cause the client processing module to:

determine channel characteristics of the wireless transport channel at or below a receive packet rate to produce determined channel characteristics by at least one of:

determining average signal to noise ratio of the wireless transport channel on a grouping of packets by grouping of packets basis; and determining received packet error rate for a plurality of packets;

generate data rate adjustment feedback based on the channel characteristics by composing the data rate adjustment feedback to include an indication of at least one of: the signal to noise ratio of the wireless transport channel on a packet by packet basis, the average signal to noise ratio of the wireless transport channel on a grouping of packets by grouping of packets basis, and the received packet error rate for the plurality of packets;

provide the data rate adjustment feedback to the multimedia server;

wherein the server memory includes operational instructions that cause the server processing module to:

interpret the data rate adjustment feedback to determine whether data rate of data contained in packets transported via the wireless transport channel is to be adjusted by:

interpreting the indication to determine variations in the channel characteristics of the wireless transport channel with respect to a current data rate;

when the variations in the channel characteristics indicate that the current data rate is too slow, determining that the data rate of the data contained in the packets is to be increased; and when the variations in the channel characteristics indicate that the current data rate is too fast, determining that the data rate of the data contained in the packets is to be decreased; and when the data rate of data contained in packets transported via the wireless transport channel is to be adjusted, adjust data rate of packets transported via the wireless transport channel.

* * * * *